US006411083B1

(12) United States Patent
Inaba

(10) Patent No.: US 6,411,083 B1
(45) Date of Patent: Jun. 25, 2002

(54) APPARATUS FOR EFFECTIVELY DETECTING FOREIGN PARTICLES ADHERED TO MAGNETIC HEAD

(75) Inventor: Shinichi Inaba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/436,231

(22) Filed: Nov. 9, 1999

(30) Foreign Application Priority Data

Nov. 10, 1998 (JP) ............................................. 10-318815

(51) Int. Cl.$^7$ .......................... G01R 33/12; G11B 27/36
(52) U.S. Cl. ........................................... 324/210; 360/31
(58) Field of Search ................................ 324/210, 211, 324/212, 260; 360/25, 31

(56) References Cited

U.S. PATENT DOCUMENTS 4,255,807 A * 3/1981 Cosby .......................... 371/21
5,495,371 A * 2/1996 Munemoto et al. ........... 360/71

FOREIGN PATENT DOCUMENTS

| JP | 63-135508 | 9/1988 |
| JP | 3-66017 | 3/1991 |
| JP | 3-97111 | 4/1991 |
| JP | 3-147583 | 6/1991 |
| JP | 4-355212 | 12/1992 |
| JP | 6-168425 | 6/1994 |

* cited by examiner

Primary Examiner—Edward Lefkowitz
Assistant Examiner—Reena Aurora
(74) Attorney, Agent, or Firm—Whitham, Curtis & Christofferson, P.C.

(57) ABSTRACT

In an apparatus for detecting foreign particles adhered to a magnetic head, a current error rate of data read from the magnetic head is calculated, and an accumulative error rate of data read from the magnetic head is calculated. Then, the current error rate is compared with the accumulative error rate to determine whether or not foreign particles are adhered to the magnetic head.

48 Claims, 10 Drawing Sheets

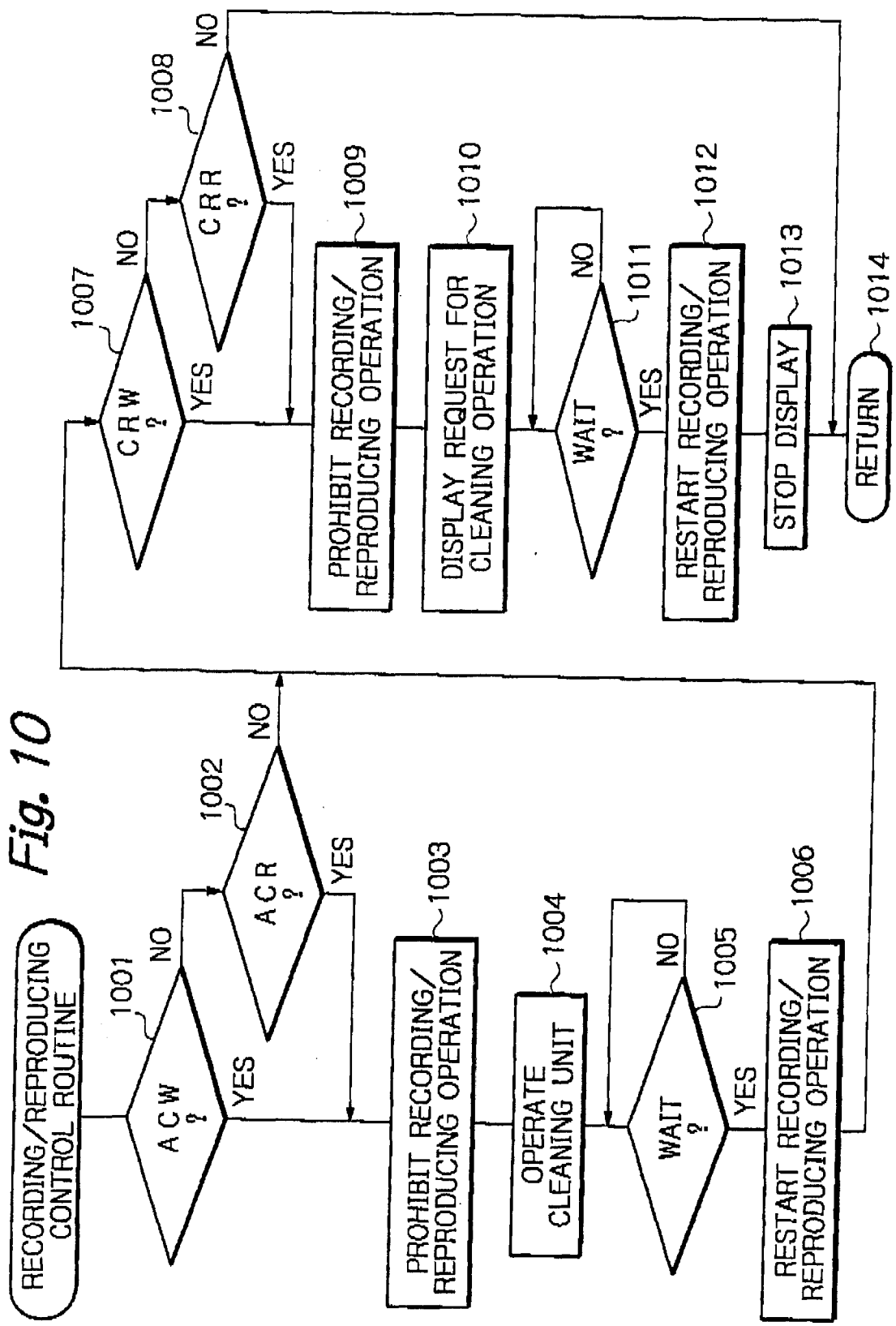

APPARATUS FOR EFFECTIVELY DETECTING FOREIGN PARTICLES ADHERED TO MAGNETIC HEAD

BACKGROUND OF THE INVENTION

1. Field of the Invention

The present invention relates to an apparatus and method for detecting foreign particles adhered to a magnetic head of a magnetic tape apparatus, for example.

2. Description of the Related Art

Generally, in a magnetic tape apparatus, a method for detecting contamination or foreign particles adhered to a magnetic head has been suggested to prevent fatal errors from being generated.

In prior art magnetic tape apparatuses, the number of errors or a peak amplitude is detected in recorded signals read from a magnetic tape via a magnetic head, and it is determined whether or not the number of errors or the peak amplitude exceeds a definite value. Only when the number of errors or the peak amplitude exceeds the definite value, is it determined that foreign particles are adhered to the magnetic head to generate a cleaning request signal, so that the foreign particles can be removed by a cleaning operation. This will be explained later in detail.

In the above-described prior art magnetic tape apparatuses, however, if a faulty writing operation is performed upon the magnetic tape, the recorded signals read from the magnetic head may include a large amount of errors or a large peak amplitude even when no foreign particles are adhered to the magnetic tape. As a result, a clearing request signal may be generated so that an unnecessary cleaning operation is carried out, which would waste time.

On the other hand, if a good writing operation is performed upon the magnetic tape, the magnetic head may include a small amount of errors or a small peak amplitude. In this state, even if foreign particles are adhered to the magnetic tape, the number of errors or the peak amplitude may not exceed the definite value, so that a clearing request signal is not generated. Thus, a necessary cleaning operation is not carried out, which would generate fatal errors.

SUMMARY OF THE INVENTION

It is an object of the present invention to provide an apparatus and method for effectively detecting foreign particles adhered to a magnetic head.

Another object is to provide a magnetic tape apparatus capable of effectively removing foreign particles adhered to a magnetic head.

According to the present invention, in an apparatus for detecting foreign particles adhered to a magnetic head, a current error rate of data read from the magnetic head is calculated, and an accumulative error rate of data read from the magnetic head is calculated. Then, the current error rate is compared with the accumulative error rate to determine whether or not foreign particles are adhered to the magnetic head.

Also, when it is determined that foreign particles are adhered to the magnetic head, an automatic cleaning signal is generated for automatically cleaning the magnetic head with a cleaning unit or a cleaning request signal for requesting a cleaning operation is sent to the operator.

BRIEF DESCRIPTION OF THE DRAWINGS

The present invention will be more clearly understood from the description set forth below, as compared with the prior art, with reference to the accompanying drawings, wherein:

FIGS. 9 and 10 are flowcharts for explaining the operation of the writing error monitoring unit of FIG. 4.

DESCRIPTION OF THE PREFERRED EMBODIMENT

Before the description of the preferred embodiment, prior art magnetic tape apparatuses will be explained with reference to FIGS. 1, 2A, 2B, 2C, 2D and 3.

Figure 1:
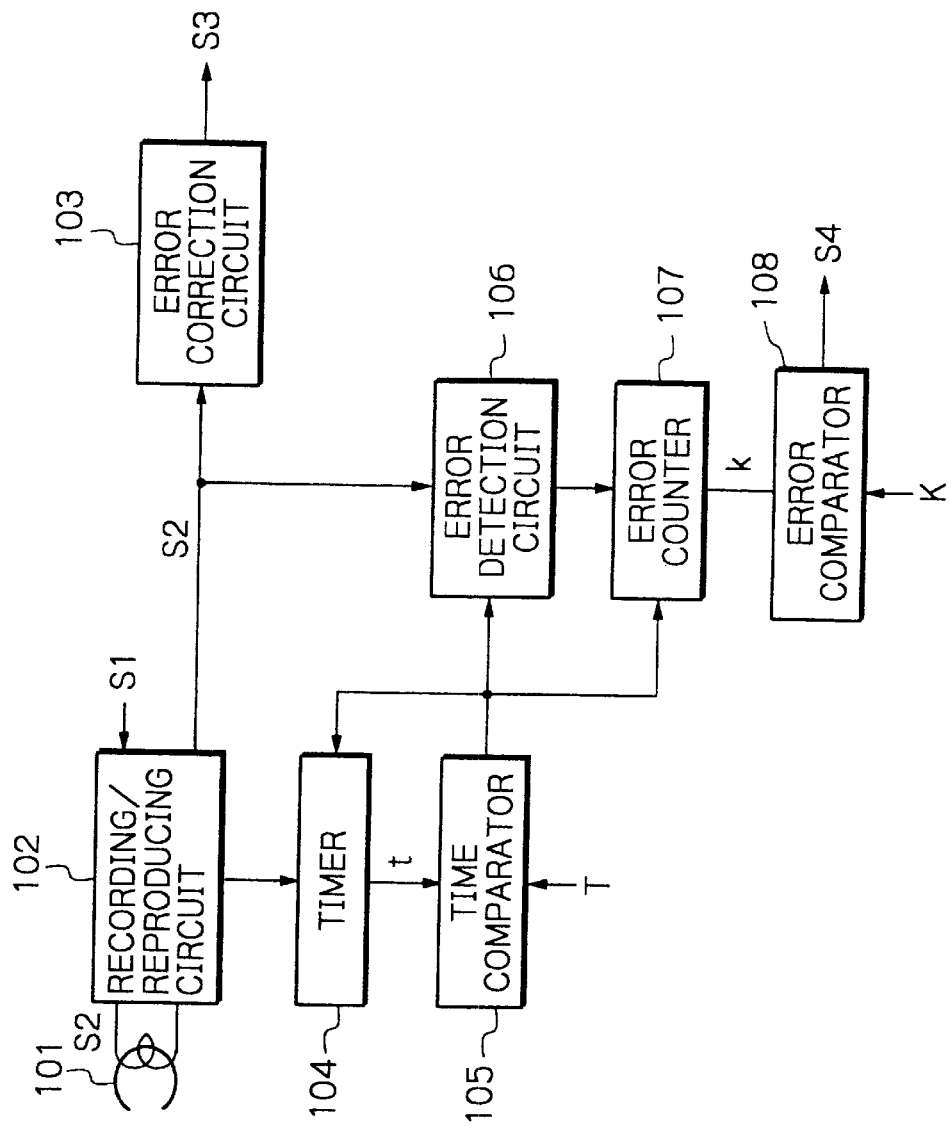
FIG. 1 is a block circuit diagram illustrating a first prior art magnetic tape apparatus.

In FIG. 1, which illustrates a first prior art magnetic tape apparatus (see JP-A-3-66017), reference numeral 101 designates a magnetic recording/reproducing head connected to a recording/reproducing circuit 102. The recording/reproducing circuit 102 receives a recording signal S1 and writes the recording signal S1 via the magnetic recording/reproducing head 101 in a magnetic tape (not shown). Also, the recording/reproducing circuit 102 reads recorded signals S2 from the magnetic tape via the recording/reproducing head 101 and transmits the recorded signals S2 to an error correction circuit 103 for generating a reproducing signal S3.

The recording/reproducing circuit 102 operates a timer 104. The time "t" of the timer 104 is compared by a time comparator 105 with a definite time period T.

Every time the time "t" of the timer 104 reaches the definite time period T, the time comparator 105 clears the timer 104 and operates an error detection circuit 106 for detecting an error in the recorded signals S2 and an error counter 107 for counting the number "k" of errors for a definite time period $T_O$. Also, an error comparator 108 compares the number "k" with a definite value K, and generates a cleaning request signal S4 when the number "k" of errors with a definite value k, of errors exceeds the definite value K.

The operation of the magnetic tape apparatus of FIG. 1 is explained next with reference to FIGS. 2A, 2B, 2C and 2D.

Figure 2:
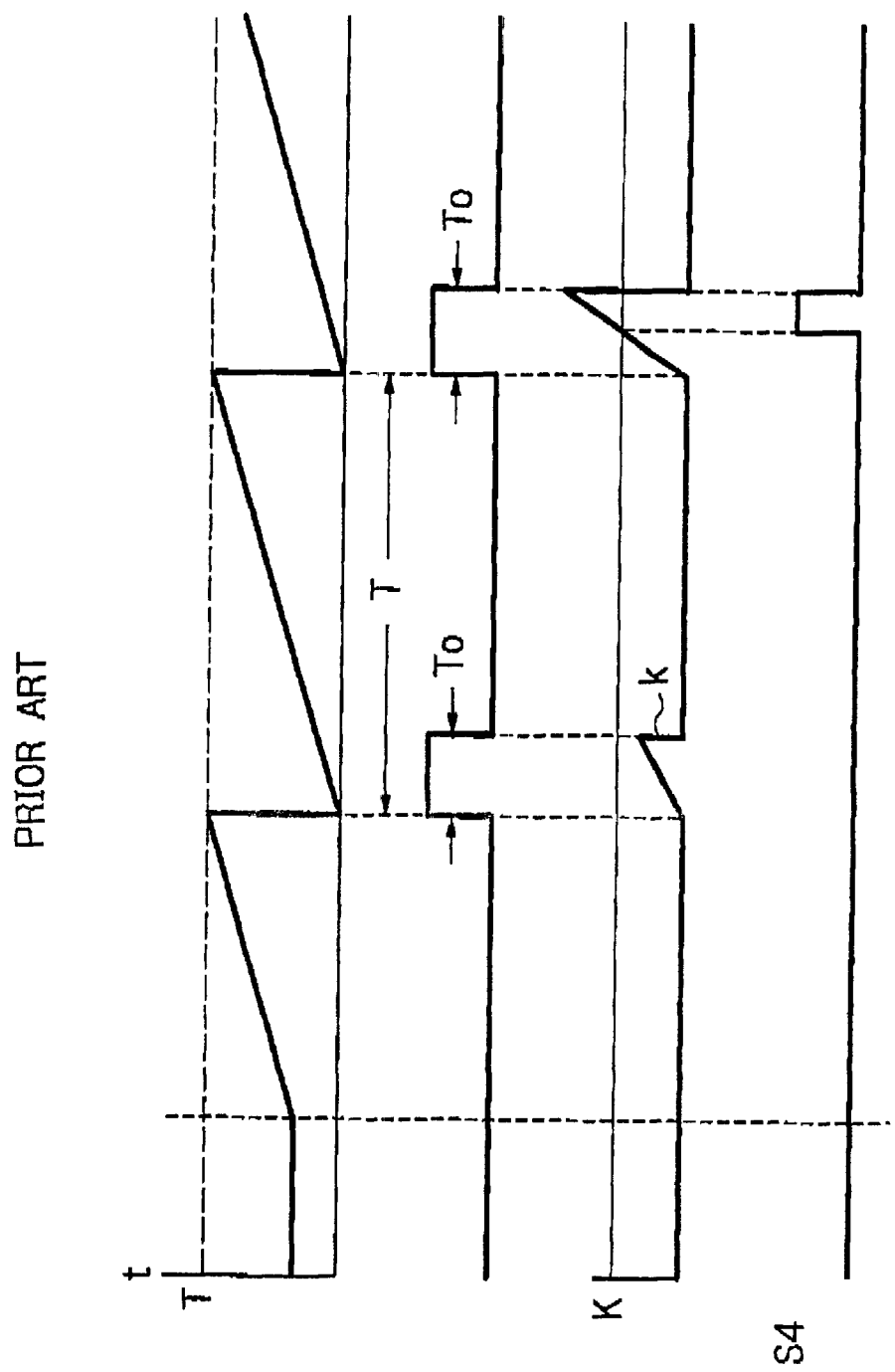
FIGS. 2A, 2B, 2C and 2D are timing diagrams for explaining the operation of the magnetic tape apparatus of FIG. 1.

When the recording/reproducing circuit 102 is operated, the time "t" of the timer 104 is changed as shown in FIG. 2A. That is, the time "t" of the timer 104 is cleared for every time period T. As a result, the error detection circuit 106 and the error counter 107 are operated for every time period $T_O$ as shown in FIG. 2B. As a result, the number "k" of errors is changed for every time period $T_O$ as shown in FIG. 2C. Only when the number "k" of errors exceeds the definite value K, does the error comparator 108 generate a cleaning request signal S4 as shown in FIG. 2D.

Thus, in the first prior art magnetic tape apparatus of FIG. 1, when the number "k" of errors exceeds the definite value K, the magnetic recording/reproducing head 101 is determined to have foreign particles adhered thereto, so that the foreign particles can be removed by a clearing operation.

Figure 3:
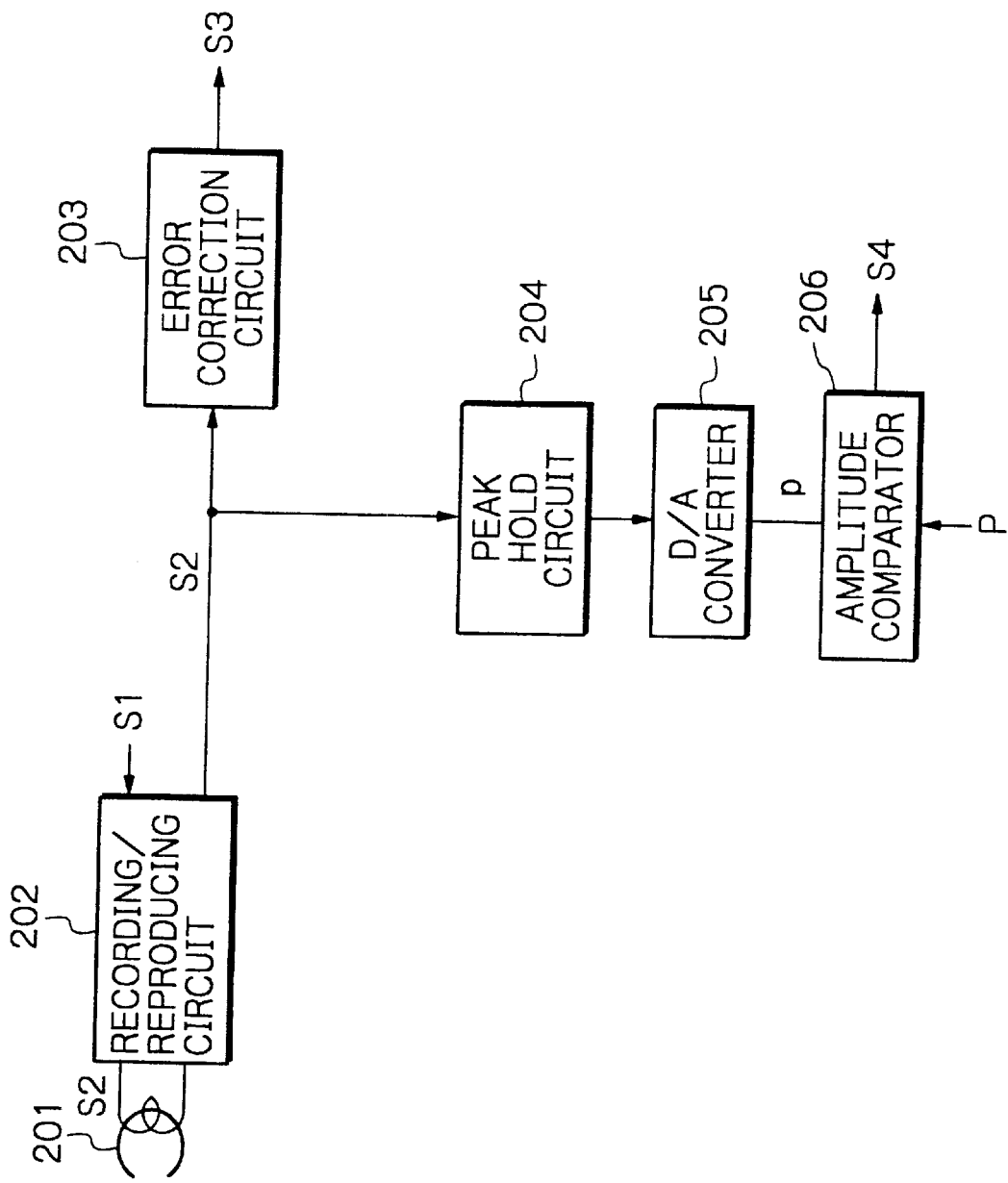
FIG. 3 is a block circuit diagram illustrating a second prior art magnetic tape apparatus.

In FIG. 3, which illustrates a second prior art magnetic tape apparatus (see JP-A-6-168425), reference numeral 201 designates a magnetic recording/reproducing head connected to a recording/reproducing circuit 202. The recording/reproducing circuit 202 receives a recording signal S1 and writes the recording signal S1 via the magnetic recording/reproducing head 101 in a magnetic tape (not shown). Also, the recording/reproducing circuit 202 reads recorded signals S2 from the magnetic tape via the recording/reproducing head 201 and transmits the recorded signals S2 to an error correction circuit 203 for generating a reproducing signal S3.

The recorded signals S2 are also supplied to a peak hold circuit 204 for holding a peak amplitude of the recorded signals S2 which are in this case for a foreign particle determining mode. The peak amplitude is converted by a digital/analog (D/A) converter 205 to generate an analog peak amplitude "p". Also, an amplitude comparator 206 compares the peak amplitude "p" with a definite value P, and generates a cleaning request signal S4 when the peak amplitude "p" exceeds the definite value P.

Thus, in the second prior art magnetic tape apparatus of FIG. 3, when the peak amplitude "p" exceeds the definite value P, the magnetic recording/reproducing head 201 is determined to have foreign particles adhered thereto, so that the foreign particles can be removed by a cleaning operation.

In the above-described magnetic tape apparatuses of FIGS. 1 and 3, however, since the values K and P are definite, if a faulty writing operation is performed upon a magnetic tape, the read recorded signals S2 from the magnetic head 101(201) may include a large amount of errors or a large peak amplitude even when no foreign particles are adhered to the magnetic tape. As a result, a clearing request signal S4 may be generated so that an unnecessary cleaning operation is carried out, which would waste time.

On the other hand, if a good writing operation is performed upon a magnetic tape, the magnetic head 101(201) may include a small amount of errors or a small peak amplitude. In this state, even if foreign particles are adhered to the magnetic tape, the number "k" of errors or the peak amplitude "p" may not exceed the definite value K or P, so that a clearing request signal S4 is not generated. Thus, a necessary cleaning operation is not carried out, which would generate fatal errors.

Figure 4:
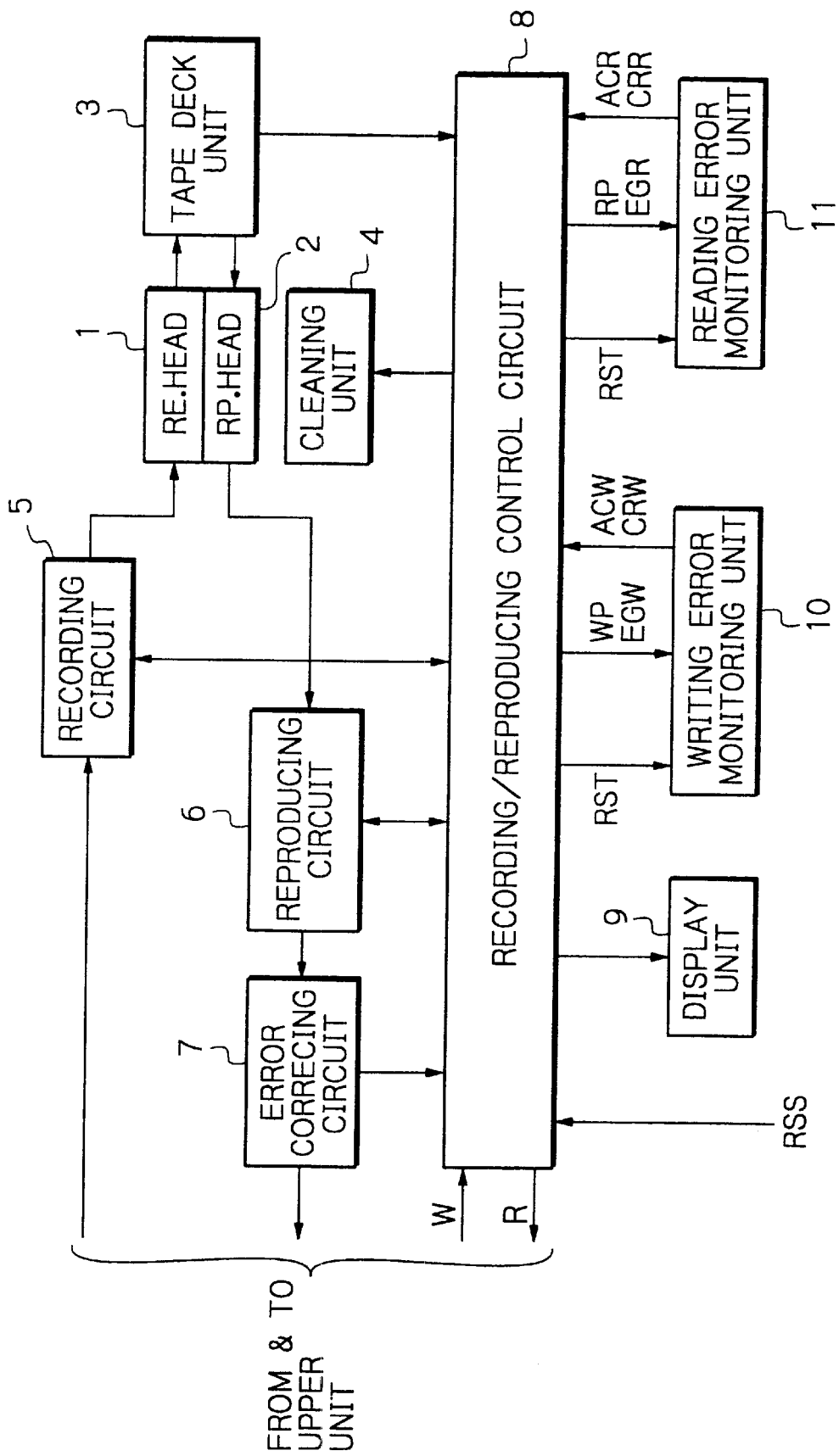
FIG. 4 is a block circuit illustrating an embodiment of the magnetic tape apparatus according to the present invention.

In FIG. 4, which illustrates an embodiment of the magnetic tape apparatus according to the present invention, reference numerals 1 and 2 designate a recording magnetic head and a reproducing magnetic head, respectively, which are installed within a tape deck unit 3 for mounting a magnetic tape (not shown).

A cleaning unit 4 is provided for cleaning the magnetic heads 1 and 2. Note that the magnetic heads 1 and 2 are provided for one drum in a helical scan system, and the magnetic heads 1 and 2 are closely combined into one block in a non-helical scan system. Therefore, the cleaning unit 4 generally cleans the magnetic heads 1 and 2 simultaneously.

A recording circuit 5 is connected to the recording magnetic head 1. Therefore, write data from an upper unit (not shown) is recorded via the recording magnetic head 1 in the magnetic tape of the tape deck unit 3.

Also, a reproducing circuit 6 and an error correcting circuit 7 are connected to the reproducing magnetic head 2. Therefore, data read via the reproducing magnetic head 2 from the magnetic tape is supplied to the reproducing circuit 6, and then, error correction is performed by the error correcting circuit 7 upon the data reproduced by the reproducing circuit 6. Thus, corrected data is supplied to the upper unit.

The tape deck unit 3, the cleaning unit 4, the recording circuit 5, the reproducing circuit 6 and the error correcting circuit 7 are connected to a recording/reproducing control circuit 8 which receives a write signal W for recording data in the magnetic tape and a read signal R for reproducing data from the magnetic tape.

Also, a display unit 9 is connected to the recording/reproducing control circuit 8, thus displaying a clearing request signal which will be explained later.

Further, a writing error monitoring unit 10 is connected to the recording/reproducing control circuit 8, to detect foreign particles adhered to the recording magnetic head 1 and generate an automatic cleaning signal ACW or a cleaning request signal CRW.

Similarly, a reading error monitoring unit 11 is connected to the recording/reproducing control circuit 8, to detect foreign particles adhered to the reproducing magnetic head 2 and generate an automatic cleaning signal ACR or a cleaning request signal CRR.

Additionally, the recording/reproducing control circuit 8 receives a restart signal RSS for restarting the recording or reproducing operation. Upon completion of a cleaning operation, the restart signal RSS is generated by an operator.

The operation of the writing error monitoring unit 10 is explained next with reference to FIGS. 5 and 6.

Figure 5:
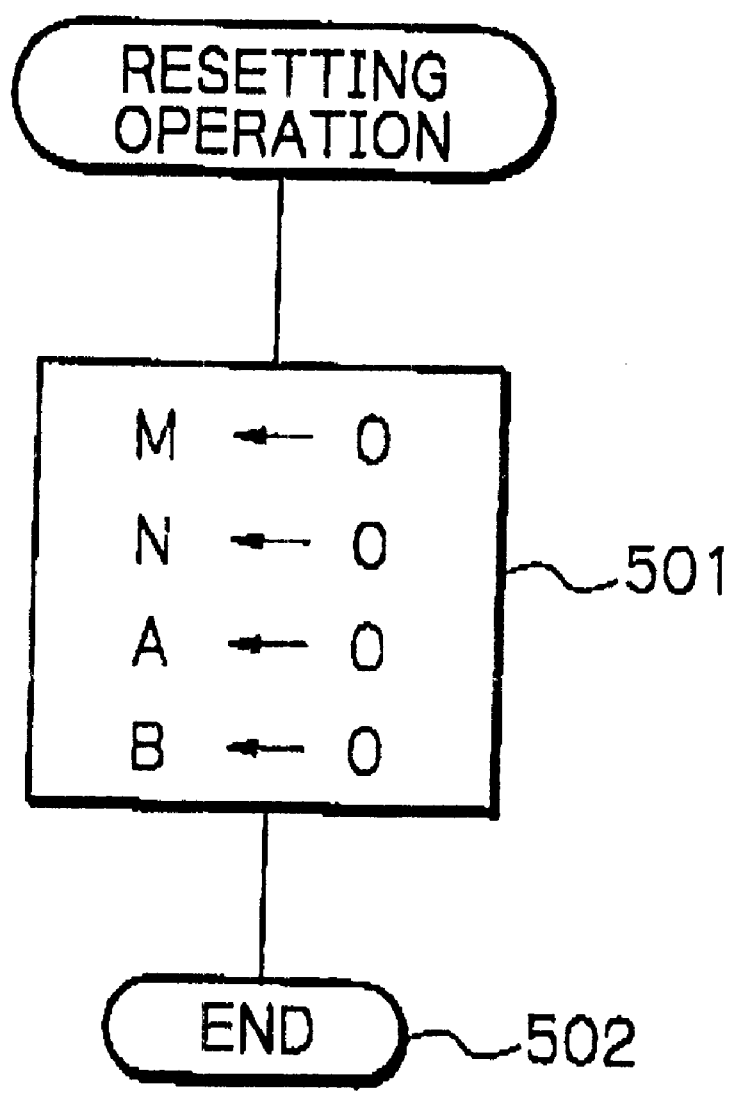
FIGS. 5 and 6 are flowcharts for explaining the operation of the writing error monitoring unit of FIG. 4.

The flowchart of FIG. 5 is started by receiving a reset signal RST from the recording/reproducing control circuit 8. Note that the reset signal RST is generated when the recording/reproducing control circuit 8 detects that a new magnetic tape is replaced with an old magnetic tape, and mounted on the tape deck unit 3.

At step 501, variables M, N, A and B are cleared. Here the variables M, N, A and B are defined as follows:

M is a variable for showing the number of accumulative written data (blocks);

N is a variable for showing the number of current written data (blocks);

A is a variable for showing the number of accumulatively corrected written data (blocks); and B is a variable for showing the number of currently corrected written data (blocks).

Then, the routine of FIG. 5 is completed by step 502.

Generally in a write operation mode, i.e., a recording operation mode, a read-after-write operation is carried out. Therefore, if a write operation of one data (or one block) performed upon the magnetic tape is determined by the error correction circuit 7 to fail, the data (block) is again written in the magnetic tape. Thus, the number of written data (blocks) and the number of corrected written data (blocks) can be obtained in accordance with the output signals of the recording reproducing control circuit 8. For example, every time one write operation is performed upon data (or one block), the recording/reproducing control circuit 8 generates one write process signal WP and transmits it to the writing error monitoring circuit 10. In this case, if this write operation fails, the recording/reproducing control circuit 8 generates one error generation signal EGW along with the above-mentioned write process signal WP.

Figure 6:
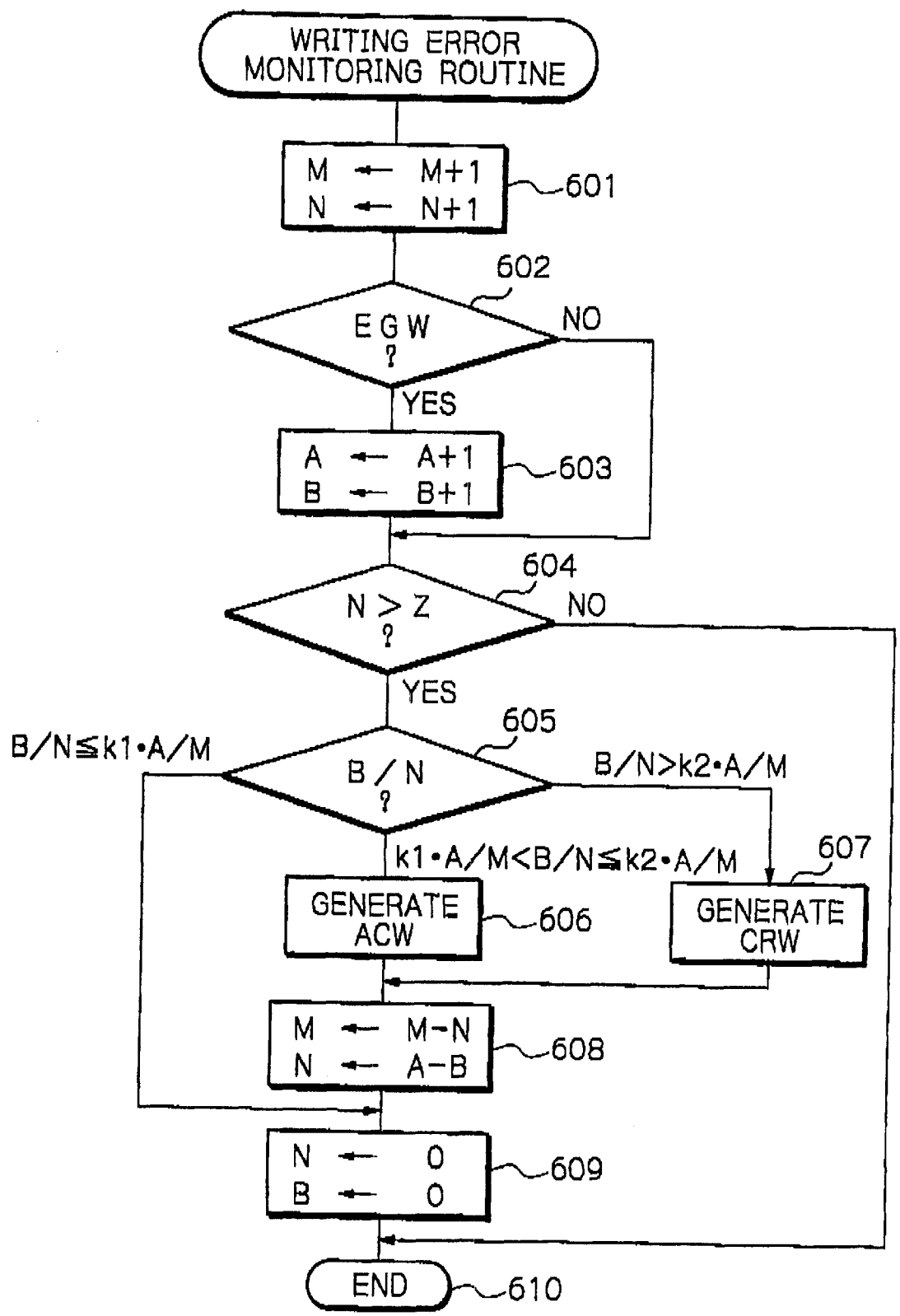

The flowchart of FIG. 6 is started by receiving a write process signal WP and an error generation signal EGW, if any, from the recording/reproducing control circuit 8.

First, at step 601, the accumulative data number variable M and the current data number variable N are incremented by +1, i.e., $$M \leftarrow M+1$$

$$N \leftarrow N+1$$

Next, at step 602, it is determined whether an error generation signal EGW is received. Only if the error generation signal EGW is received, does the control proceed to step 603. Otherwise, the control proceeds directly to step 604.

At step 603, the accumulative error number variable A and the current error number variable B are incremented by +1, i.e., $$A \leftarrow A+1$$

$$B \leftarrow B+1$$

At step 604, it is determined whether or not the current data number variable N reaches a predetermined value Z. Only if N>Z, does the control proceed to steps 605 to 609. Otherwise, the control proceeds directly to step 610.

At step 605, an accumulative (past) error rate A/M and a current error rate B/N are calculated, and the current error rate B/N is compared with the accumulative error rate A/M. Note that the accumulative error rate A/M shows the most suitable background of foreign particles adhered to the magnetic head 1.

At step 605, if $B/N \leq k1 \cdot A/M$ where k1>1, the control proceeds directly to step 609. In this case, it is determined that no foreign particles are adhered to the recording magnetic head 1.

At step 605, if $k1 \cdot A/M < B/N \leq k2 \cdot A/M$ where k2>k1, the control proceeds to step 606 which generates an automatic cleaning signal ACW and transmits it to the recording and reproducing control circuit 8. In this case, it is determined that a small amount of foreign particles are adhered to the recording magnetic head 1.

At step 605, if $B/N > k2 * A/M$, the control proceeds to step 607 which generates a cleaning request signal CRW and transmits it to the recording and reproducing control circuit 8. In this case, it is determined that a large amount of foreign particles are adhered to the recording magnetic head 1.

The control at step 606 or 607 proceeds to step 608 which decreases the accumulative data number variable M and the accumulative error number variable A by $$M \leftarrow M-N$$

$$A \leftarrow A-B$$

Thus, the effect by the removed adhered foreign particles is removed from the variables M and A.

At step 609, the current data number variable N and the current error number variable B are cleared, i.e., $$N \leftarrow 0$$

$$B \leftarrow 0$$

Then, the routine of FIG. 6 is completed by step 610.

The operation of the writing error monitoring unit 10 is explained next with reference to FIGS. 7 and 8.

Figure 7:
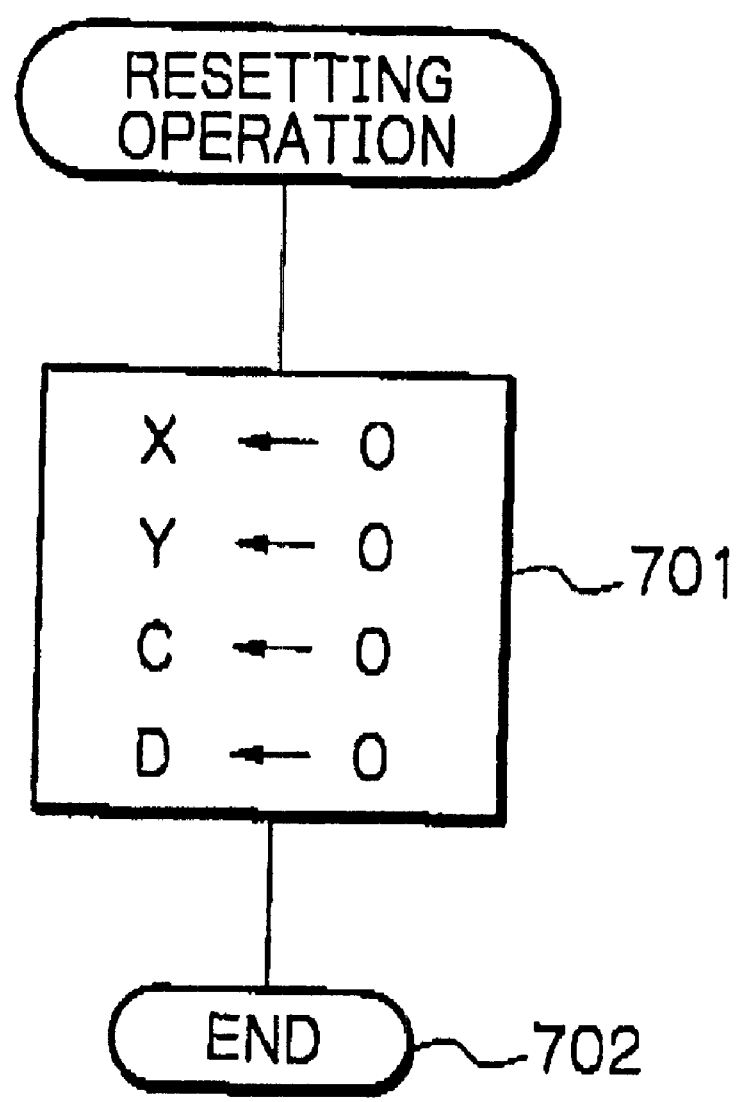
FIGS. 7 and 8 are flowcharts for explaining the operation of the reading error monitoring unit of FIG. 4.

The flowchart of FIG. 7 is also started by receiving a reset signal RST from the recording/reproducing control circuit 8.

At step 701, variables X, Y, C and D are cleared. Here the variables X, Y, C and D are defined as follows:

X is a variable for showing the number of accumulative read data (blocks);

Y is a variable for showing the number of current read data (blocks);

C is a variable for showing the number of accumulatively correcting read data (blocks); and D is a variable for showing the number of currently correcting read data (blocks).

Then, the routine of FIG. 7 is completed by step 702.

Generally in a read operation mode, i.e., a reproducing operation mode, if a read operation of one data (or one block) performed upon the magnetic tape is determined by the error correction circuit 7 to fail, the number of read data (blocks) and the number of corrected read data (blocks) can be obtained in accordance with the output signals of the recording reproducing control circuit 8. For example, every time one read operation is performed upon data (or one block), the recording/reproducing control circuit 8 generates one read process signal RP and transmits it to the writing error monitoring circuit 10. In this case if this read operation fails, the recording/reproducing control circuit 8 generates one error generation signal EGR along with the above-mentioned read process signal RP.

Figure 8:
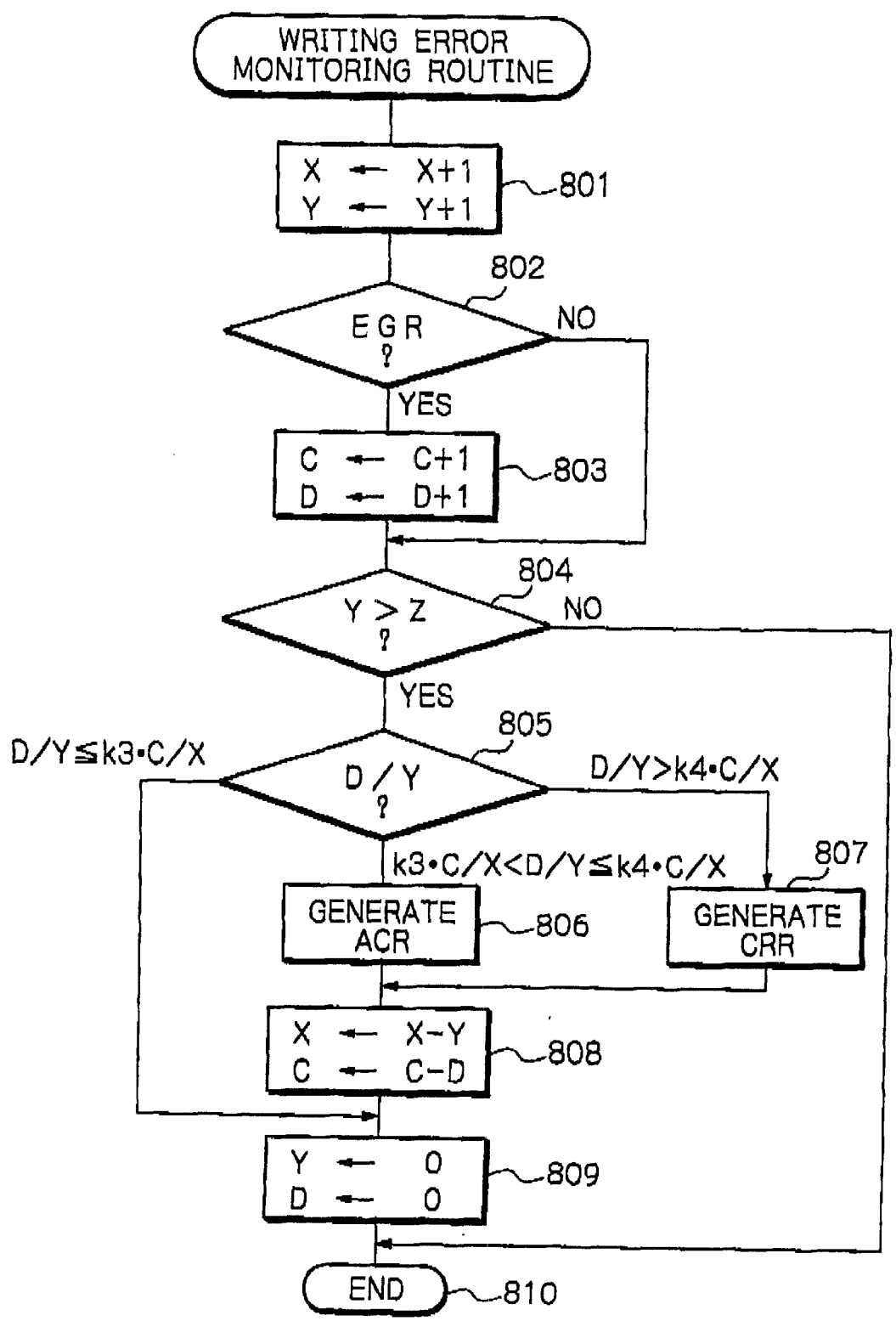

The flowchart of FIG. 8 is started by receiving a read process signal RP and an error generation signal EGR, if any, from the recording/reproducing control circuit 8.

First, at step 801, the accumulative data number variable X and the current data number variable Y are head 1. incremented by +1, i.e., $$X \leftarrow X+1$$

$$Y \leftarrow Y+1$$

Next, at step 802, it is determined whether an error generation signal EGR is received. Only if the error generation signal EGR is received, does the control proceed to step 803. Otherwise, the control proceeds directly to step 804, At step 803, the accumulative error number variable C and the current error number variable D are incremented by +1, i.e., $$C \leftarrow C+1$$

$$D \leftarrow D+1$$

At step 804, it is determined whether or not the current data number variable Y reaches the predetermined value Z. Only if Y>Z, does the control proceed to steps 805 to 809. Otherwise, the control proceeds directly to step 810.

At step 805, an accumulative (past) error rate C/X and a current error rate D/Y are calculated, and the current error rate D/Y is compared with the accumulative error rate C/X. Note that the accumulative error rate C/X shows the most suitable background of foreign particles adhered to the magnetic head 2.

At step 805, if $C/Y \leq k3 \cdot C/X$ where k3>1, the control proceeds directly to step 809. In this case, it is determined that no foreign particles are adhered to the reproducing magnetic head 2.

At step 805, if $k3 \cdot C/X \leq D/Y < k4 \cdot C/X$ where k4>k3, the control proceeds to step 806 which generates an automatic cleaning signal ACR and transmits it to the recording and reproducing control circuit 8. In this case, it is determined that a small amount of foreign particles are adhered to the reproducing magnetic head 2.

At step 805, if $D/Y > k4 \cdot C/X$, the control proceeds to step 807 which generates a cleaning request signal CRR and transmits it to the recording and reproducing control circuit 8. In this case, it is determined that a large amount of foreign particles are adhered to the reproducing magnetic head 2.

The control at step 806 or 807 proceeds to step 808 which decreases the accumulative data number variable X and the accumulative error number variable C by $$X \leftarrow X-Y$$

$$C \leftarrow C-D$$

Thus, the effect by the removed adhered foreign particles is removed from the variables X and C.

At step 809, the current data number variable Y and the current error number variable D are cleared, i.e., $$Y \leftarrow 0$$

$$D \leftarrow 0$$

Then, the routine of FIG. 8 is completed by step 810.

The operation of the recording/reproducing control circuit 8 is explained with reference to FIGS. 9 and 10. Note that the recording/reproducing control circuit 8 receives a write signal W from the upper unit to enter a write (recording) operation mode, while the recording/reproducing control circuit 8 receives a read signal R from the upper unit to enter a read (reproducing) operation mode.

Figure 9:
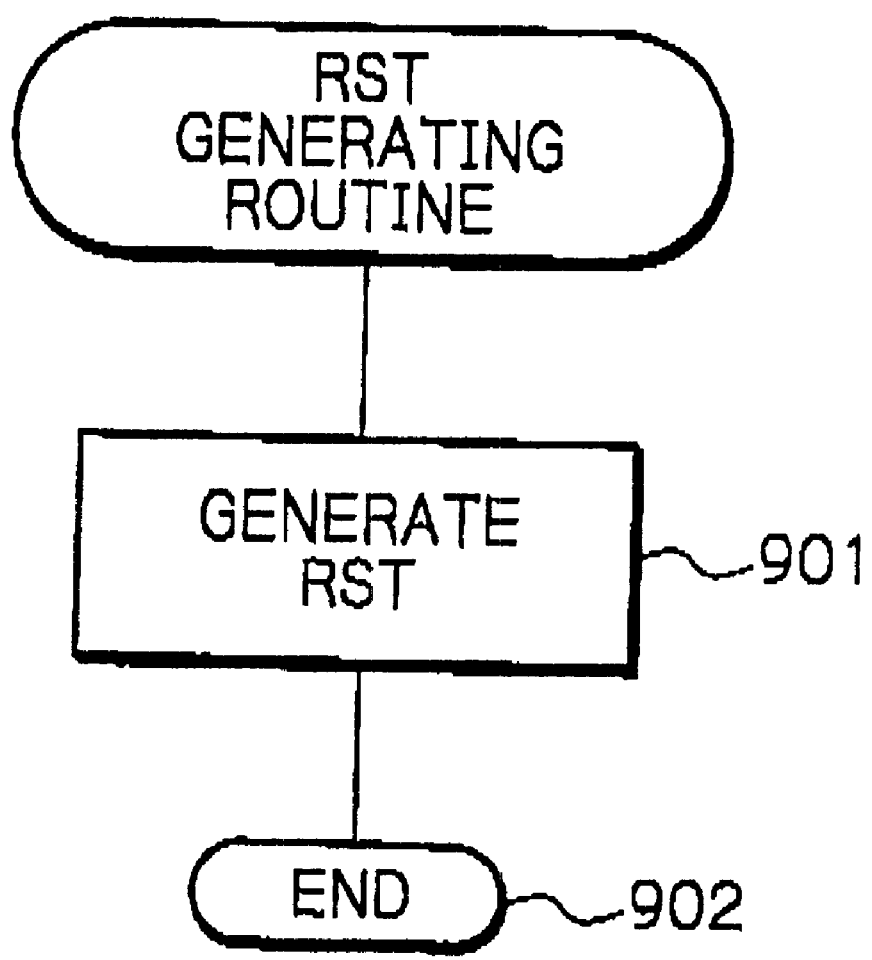

The flowchart of FIG. 9 is started by receiving a magnetic tape change signal from the tape deck unit 3.

At step 901, the recording/reproducing control circuit 8 generates a reset signal RST and transmits it to the writing error monitoring unit 10 and the reading error monitoring unit 11.

Then, the routine of FIG. 9 is completed by step 902.

The flowchart of FIG. 10 is explained next.

At step 1001, it is determined whether or not an automatic cleaning signal ACW from the writing error monitoring unit 10 is received, and at step 1002, it is determined whether or not an automatic cleaning signal ACR from the reading error monitoring unit 11 is received. Only if the automatic cleaning signal ACW or ACR is received, does the control proceeds to step 1003 through 1006. Otherwise, the control proceed directly to step 1007.

At step 1003, the recording or reproducing operation which is currently carried out is prohibited. Then, at step 1004, the cleaning unit 4 is operated to clean both the magnetic heads 1 and 2. Then, at step 1005, the recording/reproducing control circuit 8 waits for the operation of the cleaning unit 4 to complete. After the cleaning operation of the magnetic heads 1 and 2 by the cleaning unit 4 is completed, at step 1006, the recording or reproducing operation which was prohibited is restarted.

Next, at step 1007, it is determined whether or not a cleaning request signal CRW from the writing error monitoring unit 10 is received, and at step 1008, it is determined whether or not an automatic cleaning signal CRR from the reading error monitoring unit 11 is received. Only if the automatic cleaning signal CRW or CRR is received, does the control proceed to steps 1009 through 1013 otherwise the control proceeds directly to step 1014.

At step 1009, the recording or reproducing operation which is currently carried out is prohibited. Then, at step 1010, the request for cleaning operation is displayed on the display unit 9, in order for the operator to clean both the magnetic heads 1 and 2. Then, at step 1011, the recording/reproducing control circuit 8 waits for the operator to complete the cleaning operation. In this case, a restart signal RSS is received. After the restart signal RSS is received, at step 1012, the recording or reproducing operation which was prohibited is restarted. Then, at step 1013, the display of request for cleaning operation is stopped.

Then, at step 1014, the routine of FIG. 10 returns to step 1001.

At steps 1004 and 1010, the magnetic heads 1 and 2 are both cleaned; however, if the magnetic heads 1 and 2 are separated away from each other, it is possible to clean only one of the magnetic heads 1 and 2 which is determined to have foreign particles adhered thereto.

As explained hereinabove, according to the present invention, since the determination of the amount of foreign particles (or contamination) adhered to a magnetic head is carried out by comparing the current error rate from a magnetic head with the accumulative error rate, the determination of the amount of foreign particles can be accurate. As a result, only when the current error rate is greatly deviated from the accumulative error rate, is cleaning operation carried out. Therefore, unnecessary cleaning operations can be avoided which can reduce wasteful time, and only necessary cleaning operations are carried out, which can reduce fatal errors.

What is claimed is:

1. An apparatus for detecting foreign particles adhered to a magnetic head, comprising:
   means for calculating a current error rate of data read from said magnetic head;
   means for calculating an accumulative error rate of data read from said magnetic head; and
   means for comparing said current error rate with said accumulative error rate to determine whether or not foreign particles are adhered to said magnetic head.

2. The apparatus as set forth in claim 1, wherein said comparing means comprises:
   means for multiplying said accumulative error rate by a first constant larger than 1 to obtain a first reference value;
   means for multiplying said accumulative error rate by a second constant larger than said first constant to obtain a second reference value;
   means for comparing said current error rate with said first and second reference values;
   means for determining that no foreign particles are adhered to said magnetic head when said current error rate is not larger than said first reference value;
   means for determining that a first amount of foreign particles are adhered to said magnetic head when said current error rate is larger than said first reference value and not larger than said second reference value; and
   means for determining that a second amount of foreign particles larger than said first amount of foreign particles are adhered to said magnetic head when said current error rate is larger than said second reference value.

3. The apparatus as set forth in claim 2, further comprising:
   a cleaning unit for cleaning said magnetic head; and
   means for operating said cleaning unit when the first amount of foreign particles are determined to be adhered to said magnetic head.

4. The apparatus as set forth in claim 2, further comprising:
   a display unit; and
   means for displaying a cleaning request on said display unit when the second amount of foreign particles are determined to be adhered to said magnetic head.

5. An apparatus for detecting foreign particles adhered to a recording magnetic head, comprising:
- means for calculating an accumulative number of data written into said recording magnetic head;
- means for calculating an accumulative number of error data written into said recording magnetic head;
- means for calculating an accumulative error rate by dividing the accumulative number of error data by the accumulative number of data;
- means for calculating a current number of data written into said recording magnetic head for a current time period;
- means for calculating a current number of error data written into said recording magnetic head for said current time period;
- means for calculating a current error rate by dividing the current number of error data by the current number of data; and
- means for comparing the current error rate with the accumulative error rate to determine whether or not foreign particles are adhered to said recording magnetic head.

6. The apparatus as set forth in claim 5, wherein said comparing means comprises:
- means for multiplying said accumulative error rate by a first constant larger than 1 to obtain a first reference value;
- means for multiplying said accumulative error rate by a second constant larger than said first constant to obtain a second reference value;
- means for comparing said current error rate with said first and second reference values;
- means for determining that no foreign particles are adhered to said recording magnetic head when said current error rate is not larger than said first reference value;
- means for determining that a first amount of foreign particles are adhered to said recording magnetic head when said current error rate is larger than said first reference value and not larger than said second reference value; and
- means for determining that a second amount of foreign particles larger than said first amount of foreign particles are adhered to said recording magnetic head when said current error rate is larger than said second reference value.

7. The apparatus as set forth in claim 6, further comprising:
- a cleaning unit for cleaning said recording magnetic head; and
- means for operating said cleaning unit when the first amount of foreign particles are determined to be adhered to said recording magnetic head.

8. The apparatus as set forth in claim 6, further comprising:
- a display unit; and
- means for displaying a cleaning request on said display unit when the second amount of foreign particles are determined to be adhered to said recording magnetic head.

9. The apparatus as set forth in claim 7, further comprising:
- means for subtracting the current number of data from the accumulative number of data and subtracting the current number of error data from the accumulative number of error data after said cleaning unit is operated.

10. The apparatus as set forth in claim 8, further comprising:
- means for subtracting the current number of data from the accumulative number of data and subtracting the current number of error data from the accumulative number of error data after said cleaning request is displayed.

11. An apparatus for detecting foreign particles adhered to a reproducing magnetic head, comprising:
- means for calculating an accumulative number of data read from said reproducing magnetic head;
- means for calculating an accumulative number of error data read from said reproducing magnetic head;
- means for calculating an accumulative error rate by dividing the accumulative number of error data by the accumulative number of data;
- means for calculating a current number of data read from said reproducing magnetic head for a current time period;
- means for calculating a current number of error data read from said reproducing magnetic head for said current time period;
- means for calculating a current error rate by dividing the current number of error data by the current number of data; and
- means for comparing the current error rate with the accumulative error rate to determine whether or not foreign particles are adhered to said reproducing magnetic head.

12. The apparatus as set forth in claim 11, wherein said comparing means comprises:
- means for multiplying said accumulative error rate by a first constant larger than 1 to obtain a first reference value;
- means for multiplying said accumulative error rate by a second constant larger than said first constant to obtain a second reference value;
- means for comparing said current error rate with said first and second reference values;
- means for determining that no foreign particles are adhered to said reproducing magnetic head when said current error rate is not larger than said first reference value;
- means for determining that a first amount of foreign particles are adhered to said reproducing magnetic head when said current error rate is larger than said first reference value and not larger than said second reference value; and
- means for determining that a second amount of foreign particles larger than said first amount of foreign particles are adhered to said reproducing magnetic head when said current error rate is larger than said second reference value.

13. The apparatus as set forth in claim 12, further comprising:
- a cleaning unit for cleaning said reproducing magnetic head; and
- means for operating said cleaning unit when the first amount of foreign particles are determined to be adhered to said reproducing magnetic head.

14. The apparatus as set forth in claim 12, further comprising:

a display unit; and means for displaying a cleaning request on said display unit when the second amount of foreign particles are determined to be adhered to said reproducing magnetic head.

15. The apparatus as set forth in claim 13, further comprising:

means for subtracting the current number of data from the accumulative number of data and subtracting the current number of error data from the accumulative number of error data after said cleaning unit is operated.

16. The apparatus as set forth in claim 14, further comprising:

means for subtracting the current number of data from the accumulative number of data and subtracting the current number of error data from the accumulative number of error data after said cleaning request is displayed.

17. A method for detecting foreign particles adhered to a magnetic head, comprising the steps of:

calculating a current error rate of data read from said magnetic head;

calculating an accumulative error rate of data read from said magnetic head; and comparing said current error rate with said accumulative error rate to determine whether or not foreign particles are adhered to said magnetic head.

18. The method as set forth in claim 17, wherein said comparing step comprises the steps of:

multiplying said accumulative error rate by a first constant to obtain a first reference value;

multiplying said accumulative error rate by a second constant larger than said first constant larger than 1 to obtain a second reference value;

comparing said current error rate with said first and second reference values;

determining that no foreign particles are adhered to said magnetic head when said current error rate is not larger than said first reference value;

determining that a first amount of foreign particles are adhered to said magnetic head when said current error rate is larger than said first reference value and not larger than said second reference value; and determining that a second amount of foreign particles larger than said first amount of foreign particles are adhered to said magnetic head when said current error rate is larger than said second reference value.

19. The method as set forth in claim 18, further comprising a step of operating a cleaning unit for cleaning said magnetic head when the first amount of foreign particles are determined to be adhered to said magnetic head.

20. The method as set forth in claim 18, further comprising a step of displaying a cleaning request on a display unit when the second amount of foreign particles are determined to be adhered to said magnetic head.

21. A method for detecting foreign particles adhered to a recording magnetic head, comprising the steps of:

calculating an accumulative number of data written into said recording magnetic head;

calculating an accumulative number of error data written into said recording magnetic head;

calculating an accumulative error rate by dividing the accumulative number of error data by the accumulative number of data;

calculating a current number of data written into said recording magnetic head for a current time period;

calculating a current number of error data written into said recording magnetic head for said current time period;

calculating a current error rate by dividing the current number of error data by the current number of data; and comparing the current error rate with the accumulative error rate to determine whether or not foreign particles are adhered to said recording magnetic head.

22. The method as set forth in claim 17, wherein said comparing step comprises the steps of:

multiplying said accumulative error rate by a first constant to obtain a first reference value;

multiplying said accumulative error rate by a second constant larger than said first constant larger than 1 to obtain a second reference value;

comparing said current error rate with said first and second reference values;

determining that no foreign particles are adhered to said magnetic head when said current error rate is not larger than said first reference value;

determining that a first amount of foreign particles are adhered to said magnetic head when said current error rate is larger than said first reference value and not larger than said second reference value; and determining that a second amount of foreign particles larger than said first amount of foreign particles are adhered to said magnetic head when said current error rate is larger than said second reference value.

23. The method as set forth in claim 22, further comprising a step of operating a cleaning unit for cleaning said recording magnetic head when the first amount of foreign particles are determined to be adhered to said recording magnetic head.

24. The method as set forth in claim 22, further comprising a step of displaying a cleaning request on a display unit when the second amount of foreign particles are determined to be adhered to said recording magnetic head.

25. The method as set forth in claim 23, further comprising a step of subtracting the current number of data from the accumulative number of data and subtracting the current number of error data from the accumulative number of error data after said cleaning unit is operated.

26. The method as set forth in claim 24, further comprising a step of subtracting the current number of data from the accumulative number of data and subtracting the current number of error data from the accumulative number of error data after said cleaning request is displayed.

27. A method for detecting foreign particles adhered to a reproducing magnetic head, comprising the steps of:

calculating an accumulative number of data read from said reproducing magnetic head;

calculating an accumulative number of error data read from said reproducing magnetic head;

calculating an accumulative error rate by dividing the accumulative number of error data by the accumulative number of data;

calculating a current number of data read from said reproducing magnetic head for a current time period;

calculating a current number of error data read from said reproducing magnetic head for said current time period;

calculating a current error rate by dividing the current number of error data by the current number of data; and comparing the current error rate with the accumulative error rate to determine whether or not foreign particles are adhered to said reproducing magnetic head.

28. The method as set forth in claim 27, wherein said comparing step comprises the steps of:
multiplying said accumulative error rate by a first constant larger than 1 to obtain a first reference value;
multiplying said accumulative error rate by a second constant larger than said first constant to obtain a second reference value;
comparing said current error rate with said first and second reference values;
determining that no foreign particles are adhered to said reproducing magnetic head when said current error rate is not larger than said first reference value;
determining that a first amount of foreign particles are adhered to said reproducing magnetic head when said current error rate is larger than said first reference value and not larger than said second reference value; and
determining that a second amount of foreign particles larger than said first amount of foreign particles are adhered to said reproducing magnetic head when said current error rate is larger than said second reference value.

29. The method as set forth in claim 28, further comprising a step of operating a cleaning unit for cleaning said reproducing magnetic head when the first amount of foreign particles are determined to be adhered to said reproducing magnetic head.

30. The method as set forth in claim 28, further comprising a step of displaying a cleaning request on a display unit when the second amount of foreign particles are determined to be adhered to said reproducing magnetic head.

31. The method as set forth in claim 29, further comprising a step of subtracting the current number of data from the accumulative number of data and subtracting the current number of error data from the accumulative number of error data after said cleaning unit is operated.

32. The method as set forth in claim 30, further comprising a step of subtracting the current number of data from the accumulative number of data and subtracting the current number of error data from the accumulative number of error data after said cleaning request is displayed.

33. An apparatus for detecting foreign particles adhered to a magnetic head, comprising an error monitoring unit for calculating a current error rate of data read from said magnetic head, calculating an accumulative error rate read of data from said magnetic head, and comparing said current error rate with said accumulative error rate to determine whether or not foreign particles are adhered to said magnetic head.

34. The apparatus as set forth in claim 33, wherein said error monitoring unit multiplies said accumulative error rate by a first constant larger than 1 to obtain a first reference value, multiplies said accumulative error rate by a second constant larger than said first constant to obtain a second reference value, compares said current error rate with said first and second reference values, so that no foreign particles are determined to be adhered to said magnetic head when said current error rate is not larger than said first reference value, a first amount of foreign particles being determined to be adhered to said magnetic head when said current error rate is larger than said first reference value and not larger than said second reference value, a second amount of foreign particles larger than said first amount of foreign particles being determined to be adhered to said magnetic head when said current error rate is larger than said second reference value.

35. The apparatus as set forth in claim 34, further comprising a cleaning unit for cleaning said magnetic head when the first amount of foreign particles are determined to be adhered to said magnetic head.

36. The apparatus as set forth in claim 34, further comprising a display unit for displaying a cleaning request on when the second amount of foreign particles are determined.

37. An apparatus for detecting foreign particles adhered to a recording magnetic head, comprising a writing error monitoring unit for calculating an accumulative number of data written into said recording magnetic head, calculating an accumulative number of error data written into said recording magnetic head, calculating an accumulative error rate by dividing the accumulative number of error data by the accumulative number of data, calculating a current number of data written into said recording magnetic head for a current time period, calculating a current number of error data written into said recording magnetic head for said current time period, calculating a current error rate by dividing the current number of error data by the current number of data, and comparing the current error rate with the accumulative error rate to determine whether or not foreign particles are adhered to said recording magnetic head.

38. The apparatus as set forth in claim 37, wherein said coriting error monitoring unit multiplies said accumulative error rate by a first constant larger than 1 to obtain a first reference value, multiplies said accumulative error rate by a second constant larger than said first constant to obtain a second reference value, and compares said current error rate with said first and second reference values, so that no foreign particles are determined to be adhered to said recording magnetic head when said current error rate is not larger than said first reference value, a first amount of foreign particles being determined to be adhered to said recording magnetic head when said current error rate is larger than said first reference value and not larger than said second reference value, a second amount of foreign particles larger than said first amount of foreign particles being determined to be adhered to said recording magnetic head when said current error rate is larger than said second reference value.

39. The apparatus as set forth in claim 38, further comprising a cleaning unit for cleaning said recording magnetic head when the first amount of foreign particles are determined to be adhered to said recording magnetic head.

40. The apparatus as set forth in claim 38, further comprising a display unit for displaying a cleaning request on when the second amount of foreign particles are determined to be adhered to said recording magnetic head.

41. The apparatus as set forth in claim 40, wherein said writing error monitoring unit subtracts the current number of data from the accumulative number of data and subtracts the current number of error data from the accumulative number of error data after said cleaning unit is operated.

42. The apparatus as set forth in claim 40, wherein said writing error monitoring unit subtracts the current number of data from the accumulative number of data and subtracting the current number of error data from the accumulative number of error data after said cleaning request is displayed.

43. An apparatus for detecting foreign particles adhered to a reproducing magnetic head, comprising a reading error monitoring unit for calculating an accumulative number of data read from said reproducing magnetic head, calculating an accumulative number of error data read from said reproducing magnetic head, calculating an accumulative error rate by dividing the accumulative number of error data by the accumulative number of data, calculating a current number of data read from said reproducing magnetic head for a current time period, calculating a current number of error data read from said reproducing magnetic head for said current time period, calculating a current error rate by dividing the current number of error data by the current number of data, and comparing the current error rate with the accumulative error rate to determine whether or not foreign particles are adhered to said reproducing magnetic head.

44. The apparatus as set forth in claim 43, wherein said reading error monitoring unit multiplies said accumulative error rate by a first constant larger than 1 to obtain a first reference value, multiplies said accumulative error rate by a second constant larger than said first constant to obtain a second reference value, compares said current error rate with said first and second reference values, so that no foreign particles are determined to be adhered to said reproducing magnetic head when said current error rate is not larger than said first reference value, a first amount of foreign particles being determined to be adhered to said reproducing magnetic head when said current error rate is larger than said first reference value and not larger than said second reference value, a second amount of foreign particles larger than said first amount of foreign particles being determined to be adhered to said reproducing magnetic head when said current error rate is larger than said second reference value.

45. The apparatus as set forth in claim 44, further comprising a cleaning unit for cleaning said reproducing magnetic head when the first amount of foreign particles are determined to be adhered to said reproducing magnetic head.

46. The apparatus as set forth in claim 44, further comprising a display unit for displaying a cleaning request on when the second amount of foreign particles are determined to be adhered to said reproducing magnetic head.

47. The apparatus as set forth in claim 46, wherein said reading error monitoring unit subtracts the current number of data from the accumulative number of data and subtracts the current number of error data from the accumulative number of error data after said cleaning unit is operated.

48. The apparatus as set forth in claim 44, wherein said reading error monitoring unit subtracts the current number of data from the accumulative number of data and subtracts the current number of error data from the accumulative number of error data after said cleaning request is displayed.

* * * * *